United States Patent [19]

Uhm et al.

[11] Patent Number: 5,974,838
[45] Date of Patent: Nov. 2, 1999

[54] OPTICAL FIBER GRAPHITE FURNACE FEATURING AN AUTOMATIC SHUTTER DOOR SYSTEM FOR FEEDING AN OPTICAL PREFORM

[75] Inventors: Daniel D. Uhm, Vinton; Robert A. Spencer, Roanoke, both of Va.

[73] Assignee: Alcatel, Paris, France

[21] Appl. No.: 09/111,234

[22] Filed: Jul. 7, 1998

[51] Int. Cl.[6] .................................................. C03B 37/07
[52] U.S. Cl. ............................................... 65/489; 65/379
[58] Field of Search ............................ 65/377, 379, 484, 65/489

[56] References Cited

U.S. PATENT DOCUMENTS

| | | | |
|---|---|---|---|
| 3,373,007 | 3/1968 | Ticknor | 65/161 |
| 4,813,989 | 3/1989 | Uchiyama | 65/489 |
| 5,032,079 | 7/1991 | Tsuchiya et al. | 432/206 |
| 5,228,893 | 7/1993 | Smithgall et al. | 65/377 |
| 5,470,369 | 11/1995 | Tsuchiya et al. | 65/379 |

FOREIGN PATENT DOCUMENTS

| | | |
|---|---|---|
| 3925961 | 2/1991 | Germany . |
| 6-199536 | 7/1994 | Japan . |
| 1523595 | 9/1978 | United Kingdom . |

*Primary Examiner*—Sean Vincent
*Attorney, Agent, or Firm*—Ware, Fressola, Van Der Sluys & Adolphson LLP

[57] ABSTRACT

An optical fiber furnace having an access port for a preform is disclosed. The access port includes a gas pressure generation and sensing device and an automatic shutter door assembly. The gas pressure generation and sensing device responds to a sensed gas pressure built up around a new preform being inserted into the optical fiber furnace, for providing an automatic shutter door opening signal. The gas pressure generation and sensing device also responds to a sensed outwardly flowing purge gas pressure escaping around an exhausted preform being removed from the optical fiber furnace, for providing an automatic shutter door closing signal. The automatic shutter door assembly responds to the automatic shutter door opening signal, for opening the automatic shutter door assembly for inserting the new preform into the optical fiber furnace. The automatic shutter door assembly also responds to the automatic shutter door closing signal, for closing the automatic shutter door assembly after removing the exhausted preform from the optical fiber furnace.

15 Claims, 2 Drawing Sheets

OPTICAL FIBER GRAPHITE FURNACE FEATURING AN AUTOMATIC SHUTTER DOOR SYSTEM FOR FEEDING AN OPTICAL PREFORM

BACKGROUND OF THE INVENTION

1. Field of the Invention

This invention relates to a draw furnace; and more particularly, a fiber optic draw furnace for heat treating a glass preform or drawing optical fibers from a preform.

2. Background of the Invention

When thermally treating a high purity optical preform for drawing into optical fiber, inflow of oxygen and other atmospheric gases into the furnace can cause substantial production problems. Oxygen causes accelerated wear of graphite furnace parts and the generation of loose silicon carbide and graphite particulates that contaminate and degrade the physical strength of a finished fiber. The interior of a furnace is traditionally prone to contamination by ambient particulate matter. Common particulates have been demonstrated to reduce the optical and physical quality of the finished fiber. Oxygen from the atmosphere or silicon dioxide ($Sio_2$) from the preform can react with materials used to line the furnaces, commonly at operating temperatures, shortening the useful life of the furnace.

In an attempt to overcome problems, prior art furnaces use two chambers separated by a partition such as a sliding door or shutter door. The door can be opened to provide access from a first chamber into a second thermal treating chamber once a preform is first decontaminated and temperature controlled in an environmentally controlled chamber. The atmosphere in both chambers is commonly purged of oxygen and particulate matter by using an inert gas.

However, this sequence of opening and closing two chambers has only been known to be actuated manually, while also inherently entailing the time-consuming steps of purging, heating, and cooling the chambers. Heating and cooling results from shutting down the heater, in the control chamber of the furnace. Shutting down the heater is often necessary to avoid higher temperature reactions at the control chamber stage when atmospheric gases and particulate matter are encountered and purged. Clearly, shutting down the furnace results in lost fiber production time as a preform cannot be immediately inserted into the furnace.

Typically, prior art furnaces require about a half-hour to cool, and an additional half-hour to reheat to furnace operating temperature. This represents valuable production time during which fibers are not being produced.

The reader is referred to U.S. Pat. No. 5,032,079, German patent DE 3,925,961, Japanese patent JP 6-199536, and Great Britain patent 1,523,595 for examples of other known prior art optical furnaces.

SUMMARY OF THE INVENTION

The invention features an optical fiber furnace having an access port for a preform. The access port includes a gas pressure generation and sensing device and an automatic shutter door assembly.

The gas pressure generation and sensing device responds to a sensed gas pressure built up around a new preform being inserted into the optical fiber furnace, for providing an automatic shutter door opening signal. The gas pressure generation and sensing device also responds to a sensed outwardly flowing purge gas pressure escaping around an exhausted preform being removed from the optical fiber furnace, for providing an automatic shutter door closing signal.

The automatic shutter door assembly responds to the automatic shutter door opening signal, for opening the automatic shutter door assembly for inserting the new preform into the optical fiber furnace. The automatic shutter door assembly also responds to the automatic shutter door closing signal, for closing the automatic shutter door assembly after removing the exhausted preform from the optical fiber furnace.

The gas pressure generation and sensing means includes top and bottom gas purge assemblies and a gas purge sensing curtain.

The top and bottom gas purge assemblies respond to top and bottom gas purge assembly supply gases, for providing top and bottom gas purge assembly gases.

The gas purge sensing curtain responds to the sensed gas pressure built up around the preform being inserted into the optical fiber furnace, for providing a transduced sensed gas pressure automatic shutter door opening signal. The gas purge sensing curtain also responds to the sensed outwardly flowing purge gas pressure escaping around the exhausted preform being removed from the optical fiber furnace, for providing a transduced sensed gas pressure automatic shutter door closing signal.

The automatic shutter door opening and closing signal processing means responds to the transduced sensed gas pressure automatic shutter door opening signal, for providing the automatic shutter door opening signal. The automatic shutter door opening and closing signal processing means also responds to the transduced sensed gas pressure automatic shutter door closing signal, for providing the automatic shutter door closing signal.

In operation, the entire sequence of inserting the preform and removing the exhausted preform is automated by sensing and responding to gas pressure differentials in the access port. An effective velocity of an exiting gas stream is maintained preventing the ingress of oxygen and other unwanted gases due to their partial pressures.

One advantage of the present invention is that it allows furnaces having one or more chambers to remain at operating temperature when removing an exhausted preform from the furnace and inserting a new preform into the furnace.

A second advantage is that the life of the furnace is increased due to a reduction of oxygen introduced into the furnace due to the efficiency of the overall chimney effect of the design and the purging and sealing means. Additionally, fewer silicon carbide and graphite particulates are generated, which are detrimental to the physical strength of optical fiber.

A third advantage is that an additional set of opening and closing actions, as required by use of two isolated chambers and an upper cover as shown in the prior art, are not required by the present invention. Thus, the overall fiber production utilization time of the furnace is increased by eliminating the need to cool down and reheat the furnace. This allows a hot swap method of removing an exhausted preform and inserting a new preform.

The present invention may be more clearly understood from the following description of a specific and preferred embodiment read in conjunction with the accompanying detailed drawing.

BRIEF DESCRIPTION OF THE DRAWING

In the drawing, like reference characters designate like parts throughout the several views.

DETAILED DESCRIPTION OF THE BEST MODE OF THE INVENTION

The following is a detailed description of the best mode of the invention known to the inventors at the time of filing the patent application.

Figure 1:
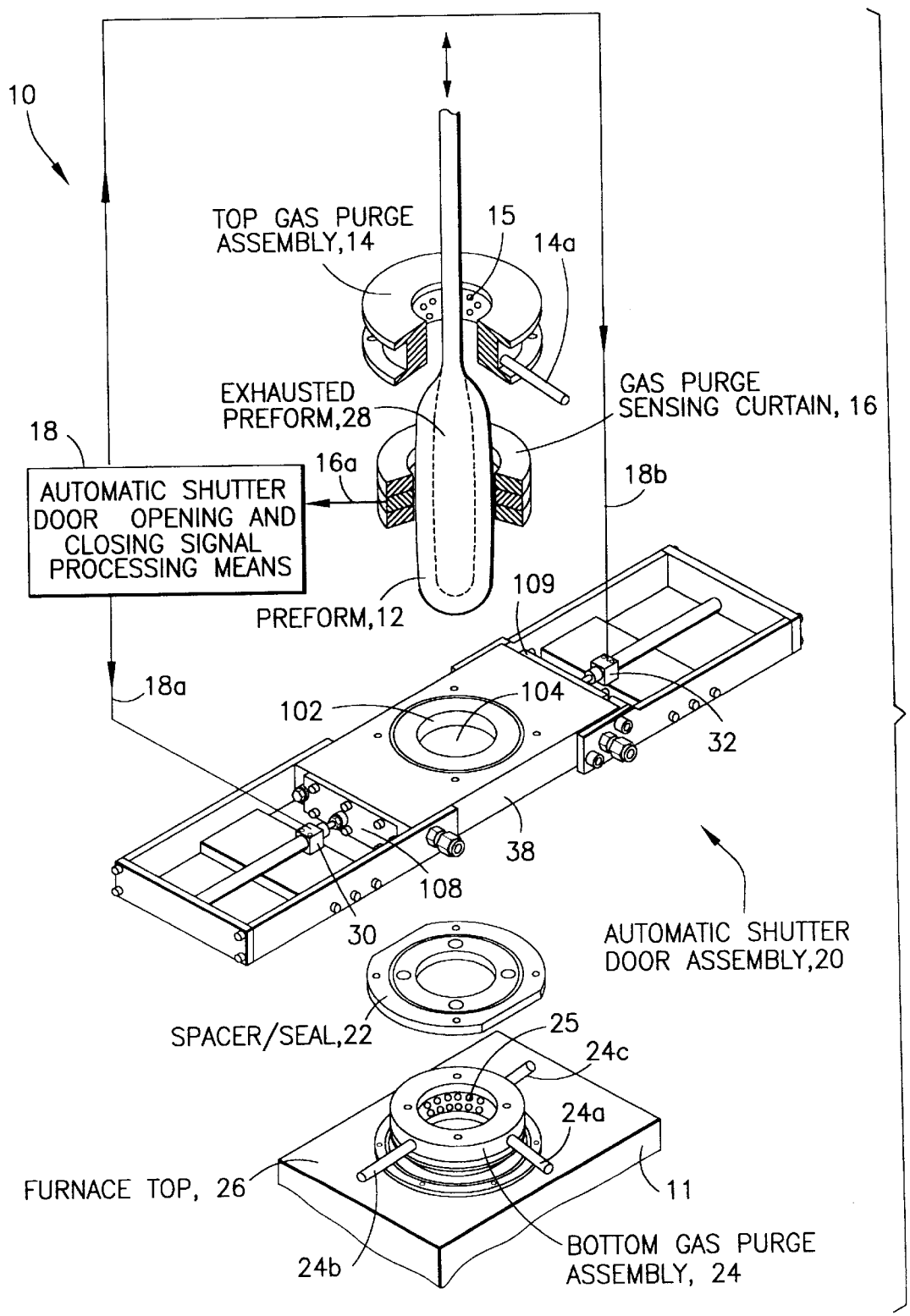
FIG. 1 is a diagram of an access port of an optical fiber furnace that is the subject matter of the present patent application.

FIG. 1 shows an access port generally indicated as 10 of an optical fiber furnace generally indicated as 11 for heating a preform 12. The access port 10 includes a top gas purge assembly 14, a gas purge sensing curtain 16, an automatic shutter door opening and closing signal processing means 18, an automatic shutter door assembly 20, a spacer/seal 22 (a spacer and seal means) and a bottom gas purge assembly 24. The top gas purge assembly 14, the gas purge sensing curtain 16, the automatic shutter door opening and closing signal processing means 18, the spacer/seal 22 and the bottom gas purge assembly 24 form part of a gas pressure generation and sensing means. The access port 10 is arranged on a furnace top 26 of the optical fiber furnace 11.

In FIG. 1, the gas purge sensing curtain 16 of the gas pressure generation and sensing means responds to a sensed gas pressure built up around the preform 12 being inserted into the top 26 of the optical fiber furnace 10, for providing automatic shutter door opening signals along lines 18a, 18b. The gas purge sensing curtain 16 of the gas pressure generation and sensing means also responds to a sensed outwardly flowing purge gas pressure escaping around an exhausted preform 28 (indicated in dashed lines) being removed from the optical fiber furnace 10, for providing automatic shutter door closing signals along the lines 18a, 18b.

The automatic shutter door assembly 20 responds to the automatic shutter door opening signals on the lines 18a, 18b, for opening the automatic shutter door assembly 20 for inserting the preform 12 into the optical fiber furnace 10. The automatic shutter door assembly 20 also responds to the automatic shutter door closing signals on the line 18, 18b, for closing the automatic shutter door assembly 20 after removing the exhausted preform 28 from the optical fiber furnace 10. In FIG. 1, the automatic shutter door assembly 20 is shown in the closed position.

The top gas purge assembly 14 responds to a top gas purge assembly supply gas provided along a top gas purge assembly supply line 14a, for providing top gas purge assembly gas. The top gas purge assembly 14 has gas openings, one of which is labelled 15, that are angled downwardly.

The gas purge sensing curtain 16 responds to the sensed gas pressure built up around the preform 12 being inserted into the optical fiber furnace 10, for providing a transduced sensed gas pressure automatic shutter door opening signal along a line 16a. The gas purge sensing curtain 16 also responds to the sensed outwardly flowing purge gas pressure escaping around the exhausted preform 28 being removed from the optical fiber furnace 10, for providing a transduced sensed gas pressure automatic shutter door closing signal along the line 16a. The gas purge sensing curtain 16 is a transducer that converts sensed gas pressure into electrical signals.

The automatic shutter door opening and closing signal processing means 18 responds to the transduced sensed gas pressure automatic shutter door opening signal along the line 16a, for providing the automatic shutter door opening signals along the lines 18a, 18b. The automatic shutter door opening and closing signal processing means 18 also responds to the transduced sensed gas pressure automatic shutter door closing signal along the line 16a, for providing the automatic shutter door closing signals along the lines 18a, 18b. The automatic shutter door opening and closing signal processing means 18 may be implemented in hardware, software, or a combination thereof, using for example, a typical microprocessor based architecture having a microprocessor, a random access memory (RAM), a read only memory (ROM), input/output devices and a data bus for connecting the aforementioned elements. The scope of the invention is not intended to be limited to any particular implementation of the automatic shutter door opening and closing signal processing means 18.

Figure 2:
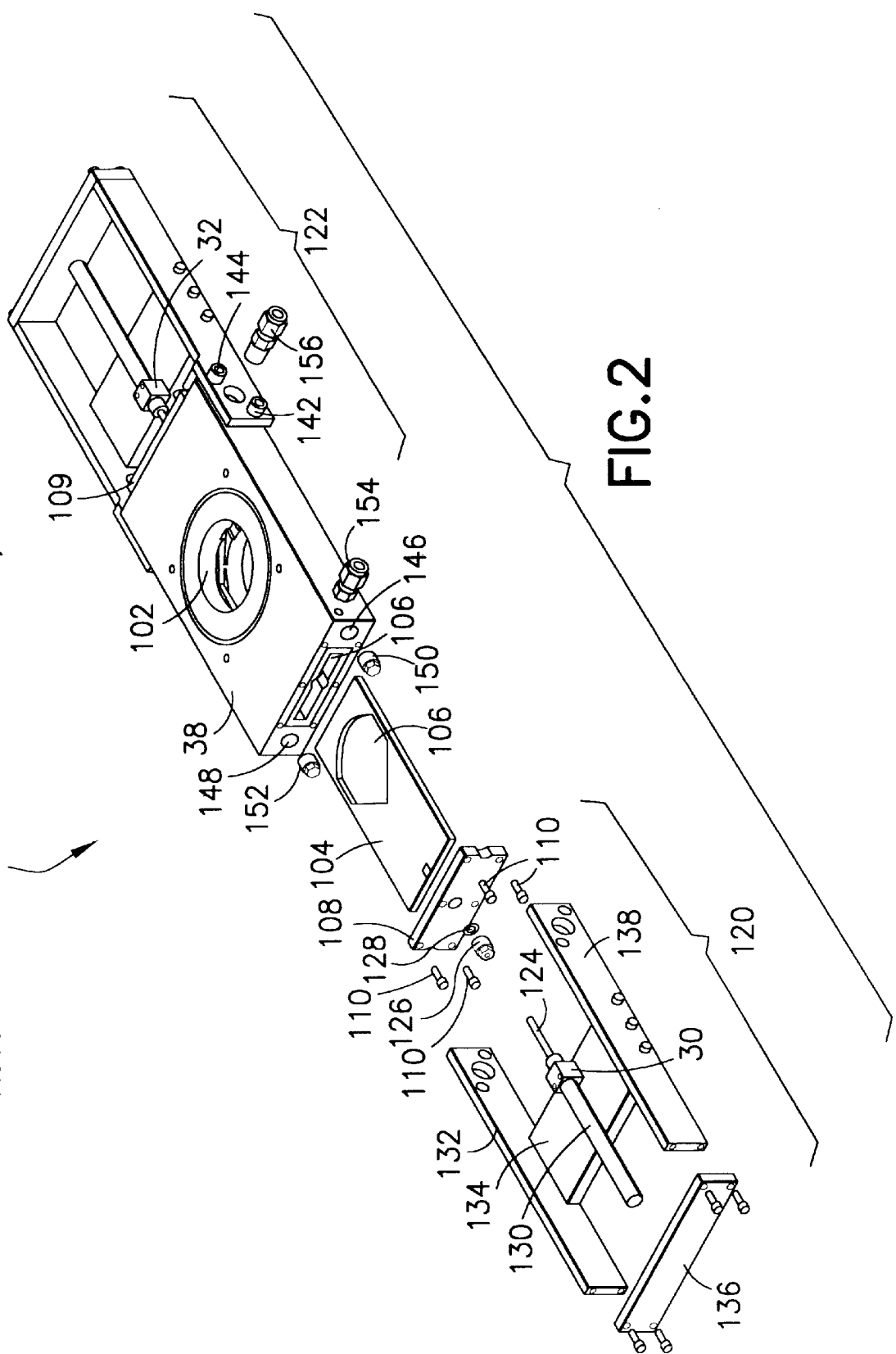
FIG. 2 is a partially exploded perspective view of an automatic shutter door assembly 20 that is part of the access port shown in FIG. 1.

The automatic shutter door assembly 20 also has two automatic shutter doors and two shutter door assembly actuators 30, 32. The two shutter door assembly actuators 30, 32 each respond to the automatic shutter door opening signals along the lines 18a, 18b, for opening respective automatic shutter doors located inside the automatic shutter door assembly 20. One of the respective automatic shutter doors 104 is shown in FIG. 2 described below. In FIG. 1, the respective automatic shutter doors are closed and a top shutter door 104 is shown. In operation, the respective automatic shutter doors are opened for inserting the preform 12 into the optical fiber furnace 10. The two shutter door assembly actuators 30, 32 each also respond to the automatic shutter door closing signals along the lines 18a, 18b, for closing the respective automatic shutter doors after removing the exhausted preform 28 from the optical fiber furnace 10. The two shutter door assembly actuators 30, 32 may be either a pneumatic cylinder or a worm gear arrangement for sliding the two automatic shutter doors into and out of the automatic shutter door assembly housing, or other suitable arrangement. The scope of the invention is not intended to be limited to any particular manner for opening and closing the automatic shutter doors.

The automatic shutter door assembly 20 has an automatic shutter door assembly housing generally indicated as 38, and the two automatic shutter doors are slidably mounted therein, as best shown and described with respect to FIG. 2.

The spacer/seal 22 is arranged between the automatic shutter door assembly 20 and the bottom gas purge assembly 24.

The bottom gas purge assembly 24 is mounted on the top of the optical fiber furnace 10. The bottom gas purge assembly 24 responds to a bottom gas purge assembly supply gas from a bottom gas purge assembly supply line 24a, for providing bottom gas purge assembly supply gas. The bottom gas purge assembly 24 has gas openings, one of which is labelled 25, that are angled upwardly.

The automatic shutter door opening and closing signal processing means 18 is designed to work in conjunction with the top gas purge assembly 14, the gas purge sensing curtain 16, the automatic door assembly 20 and the bottom gas purge assembly 24. The automatic shutter door opening and closing signal processing means 18 has set points related to minimum gas pressures sensed by the gas purge sensing curtain 16 to maintain a sufficient gas curtain to keep oxygen out of the furnace. One minimum gas pressure is related to when the preform is being inserted into the furnace and the doors are moved from a closed to open position, and another minimum gas pressure is related to when the preform is being removed from the furnace and the doors are moved from an open to closed position. The minimum gas pressures can be determined without undue experimentation and depends on a number of parameters, including (but not limited to) the outside preform diameter and inside furnace diameter.

The bottom gas purge assembly 24 may also be cooled by water, or other suitable cooling material. As shown, the bottom gas purge assembly 24 has cooling input ports 24b, 24c connected to a cooling channel (not shown) formed inside the bottom gas purge assembly 24. In operation, the cooling material is provided to one cooling input port 24b, passes through the cooling channel (not shown), and is output from the cooling output port 24c, or vice versa.

FIG. 2 shows an exploded view of the automatic shutter door assembly 20. The automatic shutter door assembly housing 38 has a preform housing aperture 102 therein for receiving the preform 12 when the automatic slidable shutter doors 104 are opened. The automatic slidable shutter door 104 is shown pulled out of the automatic shutter door assembly housing 38. The automatic slidable shutter door 104 has a preform aperture 106 therein for passing the preform 12 through the automatic shutter door assembly housing 38. The preform housing aperture 102 is covered by a door plate 108 connected to the automatic shutter door assembly housing 38 by fasteners 110. The other automatic slidable shutter door is not shown but similarly constructed. For example, on the other side of the automatic shutter door assembly housing 38, a door plate 109 covers a corresponding preform housing aperture (not shown).

In operation, the two shutter doors 104 are slidably arranged in an overlapping manner for movement inside the automatic shutter door assembly housing 38, one sliding on top of the other. When automatic slidable shutter doors 104 are open so the preform can pass through, each preform housing aperture 106 is in registration with the other. When automatic slidable shutter doors 104 are closed so the preform cannot pass through, each preform aperture 106 is not in registration with the other. In this state the top of the furnace is closed so the heat cannot escape out of the furnace top 11.

The two shutter door assembly actuators 30, 32 are a part of shutter door assembly actuator assemblies generally indicated as 120, 122. As shown, the shutter door assembly actuator assembly 120 is shown detached from the automatic shutter door assembly housing 38, and the shutter door assembly actuator assembly 122 is shown attached to the automatic shutter door assembly housing 38.

The shutter door assembly actuator assembly 120 has a slidably actuator rod 124 coupled through to the door plate 108 by a coupler 126 and a washer 128 and connected to the shutter door 104. The slidably actuator rod 124 moves the shutter door 104 inside the automatic shutter door assembly housing 38. The shutter door assembly actuator assembly 120 also has a rod housing 130, supporting plates 132, 134, 136, 138 and is connected to the automatic shutter door assembly housing 38 by fasteners (not shown). The shutter door assembly actuator assembly 122 is similarly constructed, and is connected to the automatic shutter door assembly housing 38 by fasteners 142, 144.

The automatic shutter door assembly housing 38 is mounted to the furnace top 11 (FIG. 1) which is hot; and, in view of this, is cooled by a cooling gas, or other suitable cooling gas or liquid. The automatic shutter door assembly housing 38 is formed from a solid piece of material, such as metal, and manufactured with cooling channels generally indicated as 146, 148 that are bored longitudinally therein. The solid piece of material helps to reduce the number of sealing joints. The cooling channels 146, 148 are capped or enclosed on each end of the automatic shutter door assembly housing 38 by cooling channel bolts 150, 152, two of which are shown on the left side of FIG. 2. The two cooling channel bolts on the right side of the automatic shutter door assembly housing 38 are not shown in FIG. 2. The automatic shutter door assembly housing 38 also has gas input and output ports bored into the sides thereof for receiving gas couplers 154, 156, two of which are shown in the front part of the automatic shutter door assembly housing 38. The two gas couplers on the back side of the automatic shutter door assembly housing 38 are not shown in FIGS. 1 and 2. In operation, one gas coupler 154 receives the cooling gas, which passes through the cooling channel (not shown), and the other gas coupler 156 is an output for the cooling gas 156, or vice versa.

The optical furnace design shown, described and claimed herein provides important advantages over the prior art designs. Since the optical fiber graphite furnace does not have to be shut down when removing an exhausted preform from the furnace and inserting a new preform into the furnace, the life expectancy of the furnace is increased because of the reduction of oxygen introduced into the furnace. Moreover, fewer silicon carbide and graphite particulates are generated, which would be detrimental to the physical strength of the fiber. Moreover still, the overall fiber production utilization time of the furnace is increased by eliminating the need to cool down and reheat the furnace.

As those skilled in the art will recognize, the invention is not necessarily limited to the specific embodiments described herein, and the inventive concept may be implemented in additional ways, all in accordance with the claims below. For example, the present invention is shown and described using two shutter doors, although the scope of the invention is intended to cover an embodiment using a single shutter door.

What is claimed is:

1. An optical fiber furnace having an access port for a preform, the access port comprising:

gas pressure generation and sensing means that responds to a sensed gas pressure built up around a new preform being inserted into the optical fiber furnace, for providing an automatic shutter door opening signal, and that responds to a sensed outwardly flowing purge gas pressure escaping around an exhausted preform being removed from the optical fiber furnace, for providing an automatic shutter door closing signal; and an automatic shutter door assembly that responds to the automatic shutter door opening signal, for opening the automatic shutter door assembly for inserting the new preform into the optical fiber furnace, and that responds to the automatic shutter door closing signal, for closing the automatic shutter door assembly after removing the exhausted preform from the optical fiber furnace.

2. An optical fiber furnace according to claim 1, wherein the gas pressure generation and sensing means further comprises:

a top gas purge assembly, responsive to a top gas purge assembly supply gas, for providing a top gas purge assembly gas.

3. An optical fiber furnace according to claim 2, wherein the gas pressure generation and sensing means further comprises:

a gas purge sensing curtain that responds to the sensed gas pressure built up around the new preform being inserted into the optical fiber furnace, for providing a transduced sensed gas pressure automatic shutter door opening signal, and that further responds to the sensed outwardly flowing purge gas pressure escaping around the exhausted preform being removed from the optical fiber furnace, for providing a transduced sensed gas pressure automatic shutter door closing signal.

4. An optical fiber furnace according to claim 1, wherein the gas pressure generation and sensing means further comprises:

automatic shutter door opening and closing signal processing means that responds to the transduced sensed gas pressure automatic shutter door opening signal, for providing the automatic shutter door opening signal, and that responds to the transduced sensed gas pressure automatic shutter door closing signal for providing the automatic shutter door closing signal.

5. An optical fiber furnace according to claim 1, wherein the automatic shutter door assembly further comprises:

two automatic shutter doors; and two shutter door assembly actuators that each respond to the automatic shutter door opening signal, for opening respective automatic shutter doors for inserting the new preform into the optical fiber furnace, and that each respond to the automatic shutter door closing signal, for closing the respective automatic shutter doors after removing the exhausted preform from the optical fiber furnace.

6. An optical fiber furnace according to claim 5, wherein the automatic shutter door assembly further comprises:

an automatic shutter door assembly housing; and wherein the two automatic shutter doors are slidably mounted therein.

7. An optical fiber furnace according to claim 6, wherein the two shutter door assembly actuators are pneumatic cylinders for sliding the two automatic shutter doors into and out of the automatic shutter door assembly housing.

8. An optical fiber furnace according to claim 6, wherein the two shutter door assembly actuators are worm gear arrangements for sliding the two automatic shutter doors into and out of the automatic shutter door assembly housing.

9. An optical fiber furnace according to claim 1, wherein the gas pressure generation and sensing means further comprises a bottom gas purge assembly that responds to a bottom gas purge assembly supply gas, for providing a bottom gas purge assembly gas.

10. An optical fiber furnace according to claim 8, wherein the gas pressure generation and sensing means further comprises a spacer and seal means arranged between the automatic shutter door assembly and the bottom gas purge assembly.

11. An optical fiber furnace according to claim 1, wherein the gas pressure generation and sensing means further comprises top and bottom gas purge assemblies, a gas purge sensing curtain and an automatic shutter door opening and closing signal processing means;

wherein the top and bottom gas purge assemblies responds to top and bottom gas purge assembly supply gases, for providing top and bottom gas purge assembly gases;

wherein the gas purge sensing curtain responds to the sensed gas pressure built up around the new preform being inserted into the optical fiber furnace, for providing a transduced sensed gas pressure automatic shutter door opening signal, and further responds to the sensed outwardly flowing purge gas pressure escaping around the exhausted preform being removed from the optical fiber furnace, for providing a transduced sensed gas pressure automatic shutter door closing signal; and wherein the automatic shutter door opening and closing signal processing means responds to the transduced sensed gas pressure automatic shutter door opening signal, for providing the automatic shutter door opening signal, and further responds to the transduced sensed gas pressure automatic shutter door closing signal for providing the automatic shutter door closing signal.

12. An optical fiber furnace according to claim 11, wherein the automatic shutter door assembly further comprises:

two automatic shutter doors; and two shutter door assembly actuators that each respond to the automatic shutter door opening signal, for opening respective automatic shutter doors for inserting the new preform into the optical fiber furnace, and that each respond to the automatic shutter door closing signal, for closing the respective automatic shutter doors after removing the exhausted preform from the optical fiber furnace.

13. An optical fiber furnace according to claim 12, wherein the automatic shutter door assembly further comprises:

an automatic shutter door assembly housing; and wherein the two automatic shutter doors are slidably mounted therein.

14. An optical fiber furnace according to claim 13, wherein the two shutter door assembly actuators are pneumatic cylinders for sliding the two automatic shutter doors into and out of the automatic shutter door assembly housing.

15. An optical fiber furnace according to claim 14, wherein the two shutter door assembly actuators are worm gear arrangements for sliding the two automatic shutter doors into and out of the automatic shutter door assembly housing.

* * * * *